United States Patent [19]

Breitenbach et al.

[11] Patent Number: 5,674,436
[45] Date of Patent: Oct. 7, 1997

[54] PREPARATION OF HYDROGEN PEROXIDE/POLYMER COMPLEXES IN POWDER FORM

[75] Inventors: Jörg Breitenbach, Mannheim; Axel Sanner, Frankenthal, both of Germany

[73] Assignee: BASF Aktiengesellschaft, Ludwigshafen, Germany

[21] Appl. No.: 565,394

[22] Filed: Nov. 30, 1995

[30] Foreign Application Priority Data

Dec. 2, 1994 [DE] Germany .................. 44 42 900.2

[51] Int. Cl.⁶ ................................................ A61K 31/79
[52] U.S. Cl. .................................... 264/6; 264/12
[58] Field of Search .............. 264/6, 12; 252/186.28, 252/186.29; 424/78.07, 78.24, 616

[56] References Cited

U.S. PATENT DOCUMENTS

| 3,376,110 | 4/1968 | Shiraeff | 423/272 |
| 3,480,557 | 11/1969 | Shiraeff . | |
| 4,684,519 | 8/1987 | Barabas | 424/78.07 |
| 5,008,093 | 4/1991 | Merianos . | |
| 5,183,901 | 2/1993 | Login . | |
| 5,190,749 | 3/1993 | Login . | |

FOREIGN PATENT DOCUMENTS

92/17158  10/1992  WIPO .

Primary Examiner—David A. Simmons
Assistant Examiner—Kenneth M. Jones
Attorney, Agent, or Firm—Keil & Weinkauf

[57] ABSTRACT

Hydrogen peroxide complexes in powder form are prepared by spray drying aqueous or alcoholic solutions.

4 Claims, No Drawings

PREPARATION OF HYDROGEN PEROXIDE/POLYMER COMPLEXES IN POWDER FORM

The present invention relates to a process for peparing free-flowing hydrogen peroxide complexes which are in powder form and are based on polymers of heterocyclic N-vinyl compounds.

It is generally known that hydrogen peroxide decomposes on prolonged storage. This is why a large number of stabilizers, such as polyvinylpyrrolidone, has been used with the intention of preventing or slowing down the decomposition process.

U.S. Pat. No. 3,376,110 and U.S. Pat. No. 3,480,557 described hydrogen peroxide compositions which are stabilized with polymers which are insoluble in water and are based on heterocyclic N-vinyl compounds, which compositions are prepared by drying aqueous suspensions of the polymer and hydrogen peroxide, for example in a drying oven. However, it is disadvantageous that complete drying results in gum-like amorphous compositions.

According to U.S. Pat. No. 5,008,093, anhydrous hydrogen peroxide/polyvinylpyrrolidone complexes in powder form can be prepared by adding hydrogen peroxide to a suspension of PVP in an anhydrous organic solvent and filtering off the complex which forms.

The preparation of hydrogen peroxide/PVP complexes in anhydrous organic solvent is also described in U.S. Pat. No. 5,008,106.

The disadvantages of these processes is that, on the one hand, anhydrous solvents are required and, on the other hand, highly concentrated hydrogen peroxide solutions must be used. In addition, it cannot be precluded that the organic solvents remain in the product.

U.S. Pat. No. 5,190,749 describes the preparation of complexes in powder form of hydrogen peroxide and PVP from aqueous solutions in a fluidized bed process with subsequent drying. Powders with particular particle size distributions must be used for the fluidized bed process. Accurate metering is necessary for the addition of hydrogen peroxide since otherwise gum-like, tacky products result.

U.S. Pat. No. 5,183,901 describes a process for preparing free-flowing powders of urea, hydrogen peroxide and polyvinylpyrrolidone, in which an aqueous urea/hydrogen peroxide solution is sprayed onto a PVP fluidized bed.

SUMMARY OF THE INVENTION

It is an object of the present invention to find a simplified process for preparing hydrogen peroxide/polymer complexes.

We have found that this object is achieved by a process for preparing complexes in powder form of hydrogen peroxide and polymers based on heterocyclic N-vinyl compounds, which comprises atomizing, and subjecting to spray-drying in a stream of inert gas, an aqueous or aqueous/alcoholic solution or suspension containing hydrogen peroxide and polymers based on heterocyclic N-vinyl compounds, or corresponding solutions of the individual components.

Particularly suitable polymers based on heterocyclic N-vinyl compounds are homo- or copolymers of N-vinylcaprolactam, N-vinyl-pyrrolidone or N-vinylimidazole or mixtures of such polymers. Suitable comonomers are vinyl acetate, isopropenyl acetate, vinyl laurate, vinyl benzoate, methyl vinyl ether, 2-methylvinylimidazole, N-vinylpiperidone, N-vinyl-2-oxazolidone, methyl acrylate, ethyl acrylate, styrene or cationically modified vinyl monomers. Suitable copolymers contain, for example, from 30 to 99% by weight of an N-vinyl monomer and from 1 to 70% by weight of a comonomer.

Polyvinylpyrrolidone is preferably used as polymer. The K values of suitable soluble polymers are in the range from 10 to 100, preferably 12 to 30, particularly preferably 30 to 60. The K values are measured by the method of H. Fikentscher, Cellulose-Chemie 13 (1932) 48–64 and 71–94 (1% in $H_2O$ or ethanol at 22° C.).

The polymers can be prepared in a conventional way by solution polymerization in the presence of initiators which form free radicals. Particularly suitable solvents are water or alcohols such as ethanol or isopropanol or alcohol/water mixtures. Initiators which can be used are the conventional ones forming free radicals, such as 2,2'-azobisisobutyronitrile, 2,2'-azobis(N,N'-dimethyleneisobutyroamidine), di-tert-butyl peroxide, dibenzoyl peroxide, hydrogen peroxide, $H_2O_2$/copper, $H_2O_2$/Fe (II) or persulfates. The polymerization is normally carried out at from 30° to 100° C. The resulting polymer solutions generally have solids contents in the range from 3 to 70, preferably 30 to 60, % by weight.

The polymer solutions can be used as the result from the polymerization, without further treatment, for the process according to the invention.

It is also possible according to the invention to use suspensions of crosslinked homo- or copolymers based on heterocyclic N-vinyl compounds.

Hydrogen peroxide is preferably used in the form of 3–70, preferably 30–60, % by weight aqueous solutions.

The polymer solutions or suspensions and the aqueous hydrogen peroxide solutions can be mixed together in a simple way and atomized after the mixing.

The corresponding solutions of the individual components can also be atomized together through separate nozzles and spray dried. This procedure has the advantage that a previous mixing process is unnecessary.

The ratios of amounts are selected so that from 5 to 40% by weight, preferably 7 to 20% by weight, of hydrogen peroxide, based on the polymer solids content, are present in the solutions.

The aqueous or aqueous/alcoholic solutions or suspensions of polymers and hydrogen peroxide are then atomized, with the solutions to be atomized preferably being at from 10° to 50° C.

The solutions or suspensions to be atomized may also contain spraying aids such as polyvinyl alcohols, cellulose derivatives, starch derivatives, ligninsulfonates, polyacrylic acid and polyacrylamides. Examples of antiblocking agents which can be added are finely ground aluminum silicates, kieselguhr, colloidal silica gel, diatomaceous earth, calcium carbonate or tricalcium phosphate.

The atomization preferably takes place as hydrodynamic atomization by liquid pressure or air pressure through nozzles such as single-component, multicomponent or disk nozzles using conventional atomization equipment.

The basic principle is to atomize the solution into very small droplets. These droplets have a very large surface area, which permits rapid evaporation. The necessary small diameter of the droplets is achieved through the speed of the atomizer wheel. The achievable degree of evaporation is sufficient to remove the moisture completely from the droplets. Thermal damage to the product is avoided owing to the evaporative cooling and the shortness of the suspension time.

The drying of the liquid droplets can take place in a spray tower of conventional design, using an inert gas such as nitrogen, argon or helium as drying gas, which can be passed cocurrently or countercurrently with the liquid droplets through the drying tower. The drying gas is preferably used cocurrently, in which case the gas on entry into the tower is at from 60 to 160, preferably 90° to 140° C., and on exit from the tower is at 40 to 100, preferably 60° to 80° C. The evaporation of the solvent can take place either under atmospheric pressure or under from 0.6 to 1.2 bar.

The resulting powder can be separated from the stream of gas in a cyclone in a conventional way.

The residual solvent content of the resulting powder is generally not more than 7.5% by weight. The sizes of the resulting powder particles are generally from 10 to 150 µm. Particle sizes up to 450 µm can be obtained in a spray granulation.

The hydrogen peroxide/polymer complex in powder form prepared according to the invention contains from 0.5 to 30% by weight, preferably from 5 to 15% by weight, of hydrogen peroxide.

The process according to the invention permits hydrogen peroxide/polymer complexes to be prepared in a straightforward manner. It is particularly advantageous that the polymers used for this can be employed in the form of their solutions as produced in the polymerization, without further processing, for example to powders, being necessary. It is furthermore a great advantage that hydrogen peroxide does not have to be used in the form of highly concentrated or anhydrous solutions.

It was additionally surprising that no decomposition processes occur in the spray drying.

Hydrogen peroxide complexes prepared by the process according to the invention can be used, for example, in disinfection or preservation, especially in toothpastes, in ache therapy, for putting on wounds, in cosmetics, eg. in hair cosmetics (hair dyeing, hair bleaching) and in depilation, or as solid component for chemical reactions such as polymerizations or oxidations, furthermore as detergent additive or as auxiliary in textile and paper bleaching and as component of filter systems, eg. for water treatment or in medicine for blood treatment, into which the described complexes with crosslinked polymers can be incorporated or applied. Since the hydrogen peroxide is released, the complexes can also be used for etching processes.

DESCRIPTION OF THE PREFERRED EMBODIMENTS

EXAMPLE 1

A solution of 500 g of polyvinylpyrrolidone, K value 30, 153 g of 50% by weight aqueous hydrogen peroxide and 1347 g of water was sprayed using a two-component nozzle under a pressure of 1.5 bar into a drying tower (diameter 900 mm; height 1400 mm). Nitrogen was used as drying gas and was 130° C. on entry into the tower and 60° C. on exit from the tower. The spray drying took place under a pressure of 1 bar. The resulting free-flowing powder was separated from the stream of gas in a cyclone and had a hydrogen peroxide content of 11.5% by weight (determined by potassium permanganate titration). The residual solvent content of the powder was 4% by weight.

EXAMPLE 2

A solution of 400 g of polyvinylcaprolactam, K value 30, 100 g of 50% by weight aqueous hydrogen peroxide solution and 1500 g of water was spray-dried under the process conditions specified in Example 1.

The resulting free-flowing powder had a hydrogen peroxide content of 10.1% by weight.

To investigate the disinfectant action, the minimum inhibitory concentration (MIC) was investigated on various samples. This test indicates the bacteriostatic and fungistatic activity of the inactivating substance. The tests are based on the guidelines for "Testing and Evaluating Chemical Disinfection Methods (date: Jan. 1, 1981)" of the Deutsche Gesellschaft für Hygiene und Mikrobiologie (DGHM). The evaluation took place after incubation at 36° C. for 72 hours. Dilution took place with water of standardized hardness without further aids (surfactants). The pH was adjusted to 7.2 with 0.1 mol/l NaOH or 0.1 mol/l HCl. The test concentrations were adjusted by the dilution steps shown below. All data in % by volume:

100, 75, 50, 25, 20, 15, 10, 7.5, 5.0, 4.0, 3.0, 2.5, 2.0, 1.5, 1.00, 0.75, 0.50, 0.250, 0.10, 0.050, 0.025, 0.01250, 0.00625 (etc. in geometric series, ie. concentration reduced by a factor of 0.5 each time).

MIC (minimum inhibitory concentration by DGHM, Jul. 12, 1991):

| Organism species: | Hydrogen peroxide complexes | |
|---|---|---|
| | Complex of Example 1 | Complex of Example 2 |
| | MIC values [%] | |
| STA | 1.5 | 1.5 |
| EC | 0.75 | 0.75 |
| PRM | 5.0 | 5.0 |
| PSA | 2.5 | 5.0 |
| CA | 0.75 | 0.75 |

The organisms are *Staphylococcus aureus* (STA), *Escherichia coli* (EC), *Proteus mirabilis* (PRM), *Pseudomonas aeruginosa* (PSA) and *Candida albicans* (CA).

The screening was not carried out until a value was found repeatedly, but was carried out only twice. The MIC values for the individual complexes are to be found in the list.

We claim:

1. A process for preparing hydrogen peroxide/polymer complexes in powder form, which comprises atomizing, and subjecting to spray-drying in a stream of inert gas, an aqueous or aqueous/alcoholic solution or suspension containing one or more polymers based on heterocyclic N-vinyl compounds and hydrogen peroxide.

2. A process as claimed in claim 1, wherein the atomization takes place through a nozzle.

3. A process as claimed in claim 1, wherein the polymer is selected from the group consisting of polyvinylcaprolactam, polyvinylpyrrolidone, polyvinylimidazole or copolymers thereof.

4. A process as claimed in claim 1, wherein the polymers and the hydrogen peroxide are introduced as separate solutions.

\* \* \* \* \*